(12) United States Patent  
Mimura et al.

(10) Patent No.: US 8,147,075 B2
(45) Date of Patent: Apr. 3, 2012

(54) PRINTED IMAGE-SET RETROREFLECTIVE SHEETING

(75) Inventors: Ikuo Mimura, Uozu (JP); Keizo Takayama, Mobara (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 790 days.

(21) Appl. No.: 11/910,794

(22) PCT Filed: Apr. 11, 2006

(86) PCT No.: PCT/JP2006/307999
§ 371 (c)(1),
(2), (4) Date: May 6, 2008

(87) PCT Pub. No.: WO2006/109880
PCT Pub. Date: Oct. 19, 2006

(65) Prior Publication Data
US 2009/0097114 A1 Apr. 16, 2009

(30) Foreign Application Priority Data
Apr. 11, 2005 (JP) .................. 2005-113097

(51) Int. Cl.
*G02B 5/128* (2006.01)
(52) U.S. Cl. ...................... 359/538; 359/463
(58) Field of Classification Search .............. 359/462,
359/463, 471, 478–479, 529, 530, 534–536,
359/538, 540, 541, 546; 348/42, 51, 59–60;
353/7
See application file for complete search history.

(56) References Cited

U.S. PATENT DOCUMENTS

| | | | |
|---|---|---|---|
| 2,951,419 A | 9/1960 | Lemelson | |
| 3,190,178 A | 6/1965 | McKenzie | |
| 3,417,959 A | 12/1968 | Schultz | |
| 4,025,159 A | 5/1977 | McGrath | |
| 4,676,613 A | 6/1987 | Collender | |
| 4,721,694 A | 1/1988 | Buss et al. | |
| 4,725,494 A | 2/1988 | Belisle et al. | |
| 5,064,272 A | 11/1991 | Bailey et al. | |
| 5,169,707 A | 12/1992 | Faykish et al. | |
| 5,376,431 A | 12/1994 | Rowland | |
| 5,712,731 A | 1/1998 | Drinkwater et al. | |
| 5,880,885 A | 3/1999 | Bailey et al. | |
| 6,318,866 B1 | 11/2001 | Mimura et al. | |
| 6,817,724 B2 | 11/2004 | Mimura et al. | |
| 2002/0086143 A1 | 7/2002 | Tanaka et al. | |
| 2004/0012872 A1* | 1/2004 | Fleming et al. | 359/885 |

FOREIGN PATENT DOCUMENTS

| | | |
|---|---|---|
| EP | 0 819 953 | 1/1998 |
| JP | 40-7870 | 4/1965 |
| JP | 52-110592 | 9/1977 |
| JP | 59-71848 | 4/1984 |
| JP | 62-121043 | 6/1987 |
| JP | 06-507737 | 9/1994 |

(Continued)

*Primary Examiner* — Jennifer L. Doak
(74) *Attorney, Agent, or Firm* — Fitzpatrick, Cella, Harper & Scinto

(57) ABSTRACT

This invention provides a retroreflective sheeting which at least comprises a printed image-incorporated retroreflective sheeting and an optical element array sheet in which a large number of light-transmissive optical elements are regularly disposed at least at a fixed location; more particularly a printed image-incorporated retroreflective sheeting which reveals a stereoscopic image when the printed image is seen through a lenticular lens sheet or a convex lens array sheet; and a reflective sheeting which uses the stereoscopic image for tamper prevention.

16 Claims, 2 Drawing Sheets

FOREIGN PATENT DOCUMENTS

| | | |
|---|---|---|
| JP | 07-270605 | 10/1995 |
| JP | 8-510415 | 11/1996 |
| JP | 10-035083 | 2/1998 |
| JP | 2001-264525 | 9/2001 |
| JP | 2004-329355 | 11/2004 |
| WO | 01/57560 | 8/2001 |

* cited by examiner

PRINTED IMAGE-SET RETROREFLECTIVE SHEETING

TECHNICAL FIELD

This invention relates to prevention of tampering of signs, number plates and the like in which retroreflective sheeting is used, by means of revealing a virtual image on the reflective sheeting utilizing visual illusion, and making use of the virtual image.

Specifically, the invention relates to retroreflective sheeting characterized by at least comprising a printed image-incorporated retroreflective sheeting and an optical element array sheet in which a large number of light-transmissive optical elements are regularly disposed at least at a fixed location, so that when the printed image is seen through the optical element array sheet, a variable image, which varies according to the relative position of the optical element array sheet to the retroreflective sheeting, is formed; or to retroreflective sheeting in which the optical element array sheet is laminated on the retroreflective sheeting to produce a variable image which varies according to the relative position of the optical element array sheet to the retroreflective sheeting.

More specifically, the invention relates to a printed image-incorporated retroreflective sheeting which is characterized in that the printed image comprises at least one kind of latent image and a lenticular lens sheet is used as the optical element array sheet, the latent image incorporated in the retroreflective sheeting being a pattern halftone printed based on the plate which is made by resolution of the image to be used for formation of a stereoscopic image at the same pitch with the lens pitch of the lenticular lens.

Also as another embodiment, the invention relates to a printed image-incorporated retroreflective sheeting which uses a convex lens array sheet as the optical element array sheet and in which the pattern incorporated therein is given by halftone printing, the line number (c) in the halftone printed part and the line number (d) of the convex lens array sheet having the relationship defined by $$c = B \times d$$

where B is a positive numerical value within the range of 0.5 to 1.5.

BACKGROUND ART

JP 2004-329355A to Sugiyama, et al. (Patent Reference 1) discloses a stereoscopic variable image-printed jigsaw puzzle which is characterized in that the jigsaw puzzle pieces are made of 0.2-3.0 mm-thick lenticular lens having a lens pitch of 20-150 lines/inch, and the beads are set in a surface of a board case on which a pattern whose image is resolved at the same pitch to the lens pitch of said lenticular lens is formed, to configure the stereoscopic, variable image; and a method for making the same.

JP 2004-329355A (Patent Reference 1) also discloses a stereoscopic, variable print jigsaw puzzle in which each jigsaw puzzle piece is formed of a dot lens sheet, and the pieces are set in a surface of a board case in which a pattern comprising a halftone printed portion is formed, to configure a stereoscopic, variable image, characterized in that the line number (m) of the halftone printed portion and the line number (n) of the dot lens sheet satisfy the following relationship $$n = 50-150, \ m = (\frac{1}{2} - \frac{3}{2}) \times n, \ m \neq n,$$

and a method for making the same.

However, this Patent Reference 1 lacks a disclosure concerning provision of a stereoscopic image in a retroreflective sheeting which retroreflects light. The jigsaw puzzle of Patent Reference 2 is said to have high visual effect and design quality, giving a feeling of achievement and satisfaction of having completed the puzzle, and increased entertainability. The Reference also states that the jigsaw puzzle pieces as combined show high decorative effect. The use of its virtual image for tamper prevention, however, is not disclosed.

JP Hei 10(1998)-035083A (Patent Reference 2) discloses a stipple pattern decorative article utilizing moire effect, which is made by printing on a surface of a transparent substrate hemispherical or circular arced planoconvex lens-formed focusing elements regularly at a constant, fine pitch; also printing on the back of the transparent substrate picture elements of identical shape, which are arrayed in identical manner, with those of the planoconvex lens-formed focusing elements, or picture elements of different shape which however are arrayed in identical manner, with the planoconvex lens-formed condensing elements, at their crossing angles shifted from those of the planoconvex lens-formed condensing elements on the front surface; or printing on a substrate different from the transparent substrate colored picture elements of identical or different shape from that of the planoconvex lens-formed focusing elements, which are arrayed in the identical manner with the planoconvex lens-formed focusing elements, and sticking the substrata to the transparent substrate, shifting their crossing angle.

Patent Reference 2, however, does not contain any disclosure relating to setting up stereoscopic images in retroreflective sheeting which retroreflects light. Although it states that the decoration of Patent Reference 2 is interesting to watch and hence can be utilized for display plates or printed matters, it is silent on use of the virtual images for tamper prevention.

Conventionally, retroreflective sheeting which reflects incident light toward the light source is well known. The retroreflective sheeting has been widely utilized in the fields making use of its retroreflectivity, such as of signs including road signs and construction signs; number plates on vehicles such as automobiles or motorcycles; safety goods such as clothing and life preservers; marking on signboards; various types of certification stickers or reflective plates and the like. In particular, adoption of retroreflective sheeting for various kinds of number plates or certification stickers is increasing in these years.

As such reflective sheeting, total internal reflection type cube-corner retroreflective sheeting, specular reflection type cube-corner retroreflecive sheeting, encapsulated lens type retroreflective sheeting, enclosed lens type retroreflective sheeting and open lens type retroreflective sheeting are well known.

Total internal reflection type cube-corner retroreflective sheeting is described, for example, in U.S. Pat. No. 3,417,959 to Schultz (Patent Reference), JP2001-264525 to Mimura (Patent Reference 4, corres. to U.S. Pat. No. 6,318,866.

Specular reflection type cube-corner retroreflective sheeting is described, for example, in JP Public Announcement Hei 8(1996)-510415A to Roland (Patent Reference 5, corres. to U.S. Pat. No. 5,376,431 and WO 01/057560 to Mimura, et al. (Patent Reference 6, corres. to U.S. Pat. No. 6,817,724).

Examples of encapsulated lens type retroreflective sheeting include those described in JP Sho 40 (1965)-007870B to McKenzie (Patent Reference 7, corres. to U.S. Pat. No. 3,190,178), JP Sho 52 (1977)-110592A to McGrath (Patent Reference 7, corres. to U.S. Pat. No. 4,025,159) and JP Sho 62 (1987)-121043A to Bailey, et al. (Patent Reference 9, corres. to U.S. Pat. No. 5,064,272).

Examples of enclosed lens type retroreflective sheeting are described in JP Sho 59(1984)-071848A to Belisle (Patent Reference 10, corres. to U.S. Pat. Nos. 4,721,694 and 4,725,494).

These patents on retroreflective sheetings, however, contain no description relating to incorporation of printed image in retroreflective sheeting or to the use of whereby obtained stereoscopic image for tamper prevention.

[Patent Reference 1] JP 2004-329355A
[Patent Reference 2] JP Hei 10(1998)-035083A
[Patent Reference 3] U.S. Pat. No. 3,417,959
[Patent Reference 4] JP2001-264525
[Patent Reference 5] JP Public Announcement Hei 8(1996)-510415A
[Patent Reference 6] WO 01/057560
[Patent Reference 7] JP Sho 40(1965)-007870B
[Patent Reference 8] JP Sho 52(1977)-110592A
[Patent Reference 9] JP Sho 62(1987)-121043A
[Patent Reference 10] JP Sho 59(1984)-071848A

DISCLOSURE OF THE INVENTION

We have diligently engaged in the research for incorporating in retroreflective sheeting, which retroreflects light, stereoscopic image and using the stereoscopic image for tamper prevention.

As the result of our studies and development, we discovered stereoscopic image could be incorporated in retroreflective sheeting by joining a light transmissive optical element array sheet with retroreflective sheeting in which a latent image formed of specific halftone printing conforming to the optical element array sheet is provided. Our further research completed the present invention.

Accordingly, therefore, the present invention provides a printed image-incorporated retroreflective sheeting which is characterized in that a lenticular lens sheet is used as the optical element array sheet and that the latent image incorporated in the retroreflective sheeting is a pattern printed based on a plate made by image resolution of the original for the stereoscopic image at the line number same as the lens pitch for the lenticular lens.

According to the present invention, furthermore, a printed image-incorporated retroreflective sheeting is provided, which is characterized in that a convex lens array sheet is used as the optical element array sheet and in which the latent image incorporated in the retroreflective sheeting is formed by halftone printing, the line number (c) in the halftone printed part and the line number (d) of the convex lens array sheet having the relationship defined by $$c = B \times d$$

where B is a positive numerical value within the range of 0.5 to 1.5.

When the printed image-incorporated retroreflective sheeting is in normal state, i.e., when the optical element array sheet is not laminated thereon, the latent image is visible like ordinary print, and hence it is difficult to tamper the latent image. In consequence, tampering of the retroreflecive sheeting having such a latent image or tampering of, for example, number plates for vehicles or certification stickers using such retroreflective sheeting becomes difficult. Thus, tamper prevention effect can be achieved.

Figure 1:
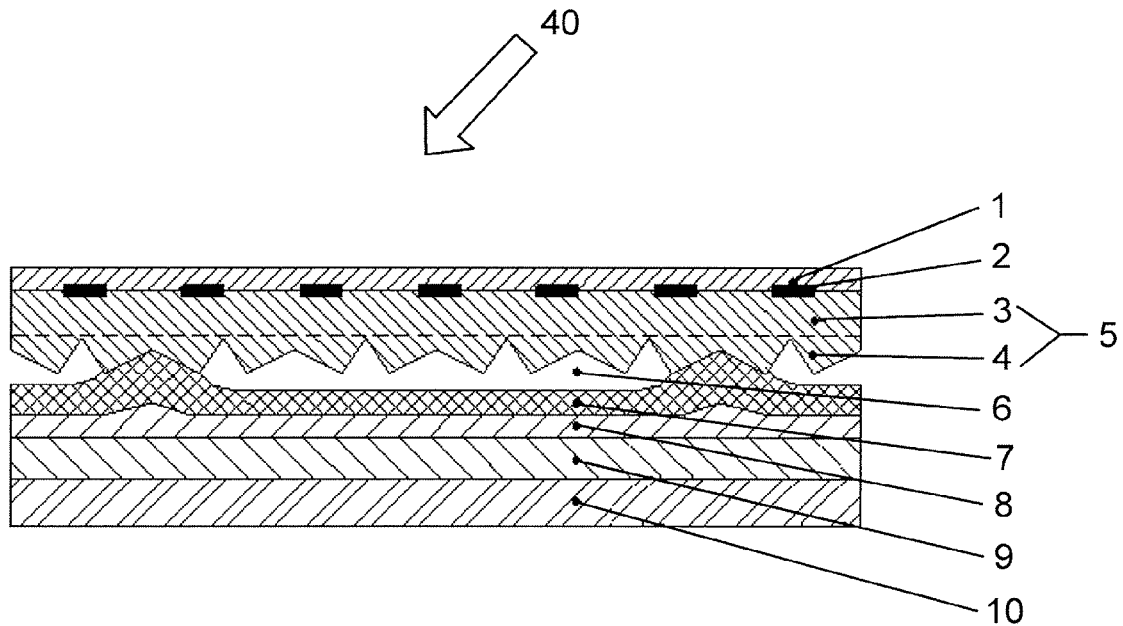
FIG. 1 is a cross-sectional view of an encapsulated triangular pyramidal cube-corner retroreflective sheeting.

EXPLANATION OF CODE NUMBERS 1. surface protective layer
2. printed layer
3. holding layer
4. retroreflective element layer
5. holding layer+retroreflective element layer as integrated
6. air layer
7. binder layer
8. support layer
9. adhesive layer
10. removable material layer
11. specular reflective layer
21. surface protective layer
22. printed layer
23. retroreflective elements
24. binder layer
25. bonding parts
26. support layer
27. specular reflective layer
28. air layer
31. surface protective layer
32. printed layer
33. transparent microbeads
34. beads binding layer
35. focus layer
36. specular reflective layer
40. direction of entering light

BEST MODE FOR PRACTICING THE INVENTION

As the retroreflecitve sheeting to be used in the present invention, those known can be utilized, i.e., total internal reflection type cube-corner retroreflective sheeting, specular reflection type cube-corner retroreflective sheeting, encapsulated lens type retroreflective sheeting, enclosed lens type retroreflective sheeting, open lens type retroreflective sheeting and the like can be conveniently used.

Total internal reflection type cube-corner retroreflective sheet is described, for example, in U.S. Pat. No. 3,417,959 to Schultz (Patent Reference 3) and JP 2001-264525 to Mimura (Patent Reference 4, corres. to U.S. Pat. No. 6,318,866), and such retroreflective sheetings as described therein can be conveniently used in the present invention. As for the details of the sheetings, refer to those references.

Specular reflection type cube-corner retroreflective sheeting is described, for example, in JP Public Announcement Hei 8(1996)-510415A to Roland (Patent Reference 5, corres. to U.S. Pat. No. 5,376,431) and WO 011057560 to Mimura, et al. (Patent Reference 6, corres. to U.S. Pat. No. 6,817,724), and such retroreflective sheetings as described therein can be conveniently used in the present invention. As for the details of the sheetings, refer to those references.

Encapsulated lens type retroreflective sheeting is described, for example, in JP Sho 40(1965)-007870B to McKenzie (Patent Reference 7, corres. to U.S. Pat. No. 3,190,178), JP Sho 52(1977)-110592A to McGrath (Patent Reference 8, corres. to U.S. Pat. No. 4,025,159) and JP Sho 62(1987)-121043A to Bailey, et al. (Patent Reference 9, corres.

to U.S. Pat. No. 5,064,272), and such retroreflective sheeting as described therein can be conveniently used in the present invention. As for the details of those sheetings, refer to those references.

Enclosed lens type retroreflective sheeting is described, for example, in JP Sho 59((1984)-071848A to Belisle (Patent Reference 10, corres. to U.S. Pat. Nos. 4,721,694 and 4,725, 494), and such retroreflective sheetings as described therein can be conveniently used in the present invention. As for the details of the sheetings, refer to the named references.

Lenticular lens to be used in the present invention is not particularly limited by its production method, so long as it has the thickness ranging 0.2-3.0 mm and a lens pitch of 20-150 lines/inch. It can be prepared by press working or printing.

When lenticular lens is made by press working such as embossing, it is satisfactory that the product has a thickness allowing changes in relative positional relationship between its surface projections and the printed image provided in the retroreflective sheeting. Preferred thickness ranges 0.2-3.0 mm.

As the material for making the lens, it can be any that is light-transmitting and transparent, for example, general-purpose synthetic resin sheet such as of polyethylene, polypropylene, polyester, nylon, urethane, polyvinyl chloride and acryl. In respect of weatherability, acrylic sheet is preferred, and in consideration of pliability, soft vinyl chloride sheet is preferred.

Lenticular lens sheet conveniently used in the present invention can be obtained by press working such a synthetic resin sheet with, for example, emboss rolls.

When the lenticular lens sheet is prepared by printing, preferably a regularly uneven pattern is configured by silk screen printing at a pitch of 20-150 lines/inch, the depressions each having 1-50 µm-wide level portion.

As transparent sheet material to be used in that occasion, sheet of polyvinyl chloride, polycarbonate, polyester, acrylic resin, polystyrene, polypropylene, polyethylene, ABS resin, biodecomposable resin and the like; transparent or semi-transparent synthetic paper; are preferred.

Regularly uneven pattern is for forming a lenticular lens layer on the surface of such a transparent sheet material as above. While the convex portions are ordinary convex circular arcs, the depressed portions are formed to have each a 1-50 µm-wide level portion at the base. Formation of such level portions renders the pattern sharp-cut and drastically reduces shear, haze, blur and the like, achieving excellent decorative effect.

The ink to be used for silk screening is not critical, so long as it is highly transparent and can form an uneven pattern without other working such as embossing. For example, braille ink or the like can be conveniently used. As commercially available good, UV POT-50209 Braille Clear manufactured by Teikoku Ink Co., Ltd. can be named.

Computer soft programs for resolving the original of stereoscopic images at the same line number to the lens pitch of lenticular lens sheet are available on the market, which can be used for the plate making. Printing at the dot density of 150-700 lines/inch is preferred, which can be carried out by direct printing, e.g., printing with an aleophilic ink, UW offset printing, silk printing, photogravure printing, flexo printing and the like by such means as on-demand printing; or by transferring the original from advancedly printed transfer paper or the like, using any of the earlier named printing methods.

It is also possible to form partially emphasized patterns, by controlling either the convex lens pattern of the convex lens array sheet to the halftone printed portion, or controlling the halftone dots in the halftone printed portion of the pattern, to the convex lens pattern of the convex lens array sheet. In particular, it is easier to control the halftone dots forming the pattern, to the convex lens pattern, and therefore, preferred.

The pattern comprising the halftone printed portion may be monochrome solid in appearance, but when it is formed by combination of parts of partially different halftone dot density and joined with a convex lens array sheet, the halftone dots of partially different sizes can produce stereoscopic sense.

Suitable selection of coloring relations between the halftone dots and the background can give an effect as if a hidden pattern were revealed.

Furthermore, where a pattern is generated by color process printing of at least two colors and at least one of the colors is provided by halftone printing, e.g., where three colors out of five-color process printing are halftone printed and the remaining colors, ordinarily solid printed, and the pattern is joined to a convex lens array sheet, the solid printed portion constituting the two-colored pattern appears flat, while the halftone printed portion constituting the three-colored pattern develops a stereoscopic image having a certain depth.

According to the invention, the line number (c) in the halftone printed portion and the line number (d) of the convex lens array sheet have the relationship defined by c=B×d, B being a positive numerical value within a range of 0.5 to 1.5. When the c is not equal to the d, a stereoscopic image is developed. Outside the above range, stereoscopic image fails to develop or become very dull and blurred, providing no visually interesting image.

According to the invention, even when the c equals the d, still stereoscopic images can be developed, by joining the arraying pattern of the convex lens array sheet with the arraying pattern of the halftone printing, at their crossing angles adjusted to $0°<\theta<45°$.

According to the invention, stereoscopic images can be obtained when the optical element array sheet is joined with the printed image in the retroreflective sheeting in either manner that the optical elements in the optical element array sheet face upward, or downward.

Hereinafter the retroreflective sheeting of the present invention is explained in further details. As the printed image-incorporated retroreflective sheeting of the present invention, any of total internal reflection type cube-corner retroreflective sheeting, specular reflection type cube-corner retroreflective sheeting, encapsulated lens type retroreflective sheeting, enclosed lens type retroreflective sheeting, open lens type retroreflective sheeting and the like can be used.

In explaining the present invention in details hereafter, first a triangular pyramidal cube-corner retroreflective sheeting, which is a typical embodiment of total internal reflection type cube-corner retroreflective sheeting, shall be explained, referring to the appended drawing.

FIG. 1 is a cross-sectional view of a triangular pyramidal cube-corner retroreflective sheeting, in which (4) is a retororeflective element layer in which triangular pyramidal reflective elements are disposed at the closest packed state, (3) is a holding layer for holding the reflective elements, and

(40) indicates the direction of entering light. Usually the retororeflective element layer (4) and the holding layer (3) are integrated (5), but different layers may be laminated. According to the purpose of use of the retroreflective sheeting of the present invention and environments in which the sheeting is used, a surface-protective layer (1), printed layer (2), binder layer (7) for providing an airtightly sealed structure for preventing infiltration of water into the back of the reflective layer (4), a support layer (8) for supporting the binder layer (7), and an adhesive layer (9) and removable layer (10) for adhering the retroreflective sheeting to other structure can be provided.

The printed layer (2) can be normally disposed between the surface-protective layer (1) and the holding layer (3), or on the surface-protective layer (1) or on the reflective plane of the retororeflective element layer (4). Where the surface-protective layer is formed of two or more layers, the printed layer may be interposed between any two layers of the surface-protective layer.

The latent image may be formed in the same layer with the printed layer, or, in a layer different from the printed layer where plural layers form the printed layer. It is preferred to form it on the front surface or back of the surface-protective layer (the light-entering side is referred to as the front surface), for obtaining clearer stereoscopic image. From the standpoint of security, its provision on the back of the surface-protective layer is more preferred.

The printed layer (2) can normally be provided by such means as gravuer printing, screen printing, offset printing, flexo printing, inkjet printing or laser printing.

The material to constitute the retroreflective element layer (4) and holding layer (3) is not critical, as long as it satisfies the flexibility requirement which is one of the objects of the present invention, while it preferably is optically transparent and is homogeneous.

Examples of the material useful for the retroreflective element layer (4) according to the present invention include polycarbonate resin, polyvinyl chloride resin, (meth)acrylic resin, epoxy resin, styrene resin, polyester resin, fluorinated resin, olefin resin such-as polyethylene resin or polypropylene resin, cellulose resin and urethane resin. For improving weatherability, ultraviolet absorber, light stabilizer, antioxidant and the like may be incorporated either alone or in combination. Furthermore, as coloring agent, various organic pigment, inorganic pigment, fluorescent pigment, dye, fluorescent dye and the like may be added.

The same resin used for the retororeflective element layer (4) can be used for the surface-protective layer (1), polyvinyl chloride resin and (meth)acrylic resin which excel in weatherability, solvent resistance and printability being particularly preferred.

For also the surface-protective layer (1), ultraviolet absorber, light stabilizer, antioxidant and the like can be incorporated either alone or in combination, for improving weatherablity. Also as coloring agent, various organic pigment, inorganic pigment, fluorescent pigment, dye, fluorescent dye and the like can be added.

Preferably the surface tension of the surface-protective layer (1) is adjusted to at least 32 dyne/cm, for imparting favorable printing characteristics, when the surface-protective layer is to be printed. Printing ink for the surface-protective layer (2) may contain, besides a resin component and coloring agent, various additives such as plasticizer, defoaming agent, leveling agent, ultraviolet absorber, light stabilizer, heat stabilizer, crosslinking agent and the like, and also may be blended with solvent for adjusting viscosity.

The resin component to be used in the ink is not particularly limited, while those excelling in dispersibility and stability of coloring agent, solubility in solvent, weatherability, printability and intimate adherability to film, such as melamine resin, epoxy resin, urethane resin, vinyl resin, polyester resin, alkyd resin and the like are preferred, which can be used either alone or two or more of them can be combined and copolymerized.

It is a general practice to provide an air layer (6) at the back of the triangular pyramidal cube-corner retroreflective elements, for enlarging the critical angle satisfying the total internal reflection conditions for the retororeflective element layer (4). With the view to prevent such troubles as reduction in critical angle due to moisture infiltration under the conditions of actual use, preferably the retororeflective element layer (4) and the support layer (8) are airtightly sealed together by a binder layer (7).

As the means for the sealing, those described in U.S. Pat. Nos. 3,190,178 and 4,025,159, JP Utility Model Sho 50(1975)-28669A and the like can be used.

As the resin to be used for the binder layer (7), (meth) acrylic resin, polyester resin, alkyd resin, epoxy resin and the like can be named, and as the means for binding, known thermofusing resin-binding method, thermosetting resin-binding method, ultraviolet ray-hardenable resin-binding method, electron-hardenable resin-binding method and the like can be suitably used.

The binder layer (7) used in the present invention may be applied over the whole surface of the support layer (8), or can be selectively disposed at joint portions with the retroreflective element layer (4) by such means as printing.

Examples of the material for making the support layer (8) include the resins useful for making the retroreflective element layer (4), film-forming resin in general, fiber, cloth, foil or plate of such metals as stainless steel, aluminum and the like, which can be used either alone or as combined.

The adhesive layer (9) used for sticking the retroreflective sheeting of the present invention to metal sheet, wooden plate, glass sheet, plastic sheet or the like, and the removable layer (10) for protecting the adhesive layer can be suitably selected from those known materials. As the adhesive, pressure-sensitive adhesive, heat-sensitive adhesive, crosslinking type adhesive and the like can be suitably used. As pressure-sensitive adhesive, polyacrylic acid ester tackifier obtained by copolymerization of acrylic acid ester such as butyl acrylate, 2-ethylhexyl acrylate, isooctyl acrylate, nonyl acrylate or the like with acrylic acid, vinyl acetate or the like, silicone resin tackifier, rubber tackifier and the like can be used. As heat-sensitive adhesive, acrylic, polyester or epoxy resin can be used.

An example of specular reflection type cube-corner retroreflective sheeting, which is another preferred embodiment of cube-corner type retroreflective sheeting of the present invention, is explained in the next, referring to its cross-sectional view.

Figure 2:
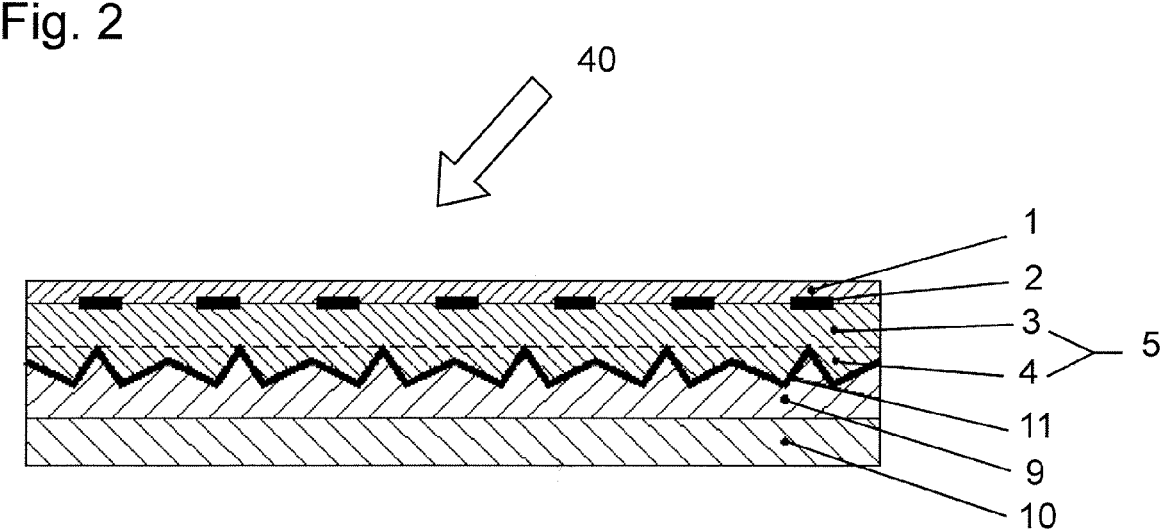
FIG. 2 is a cross-sectional view of a specular reflection type triangular pyramidal cube-corner retroreflective sheeting.

The same materials as described as to above triangular pyramidal cube-corner retroreflective sheeting can be used for the surface-protective layer (1), printed layer (2), holding layer (3), retororeflective element layer (4), integrated layer (5) of (3) and (4), adhesive layer (9) and removable layer (10), of the specular reflection type triangular pyramidal cube-corner retroreflective sheeting as illustrated in FIG. 2.

Because a metallic specular reflective layer (11) is provided on the retororeflective element layer in this embodiment, the printed layer and latent image are preferably provided on the front surface or back of the surface layer, for better visibility of the pattern.

The latent image may be formed on the same layer with the printed layer or in a different layer where the printed layer is composed of plural layers. It is preferably formed, however, on the front or back (the light-entering side is referred to as the front) of the surface-protective layer, for obtaining more distinct stereoscopic image. From the viewpoint of security, it is still better to form the latent image on the back of the surface-protective layer.

The printed layer (2) can be formed by those printing methods useful with above triangular pyramidal retroreflective sheeting, by such means as gravure printing, screen printing, offset printing, flexo printing, inkjet printing and laser printing.

For the halftone printing for developing the latent image, those printing methods useful with the triangular pyramidal retroreflective sheeting can be adopted, by such means as gravure printing, screen printing, offset printing, flexo printing, inkjet printing and laser printing.

In the occasion of printing on the surface protective layer (1), preferably the surface tension of the layer is adjusted to be at least 32 dyne/cm, for improving its printing characteristics. The ink for the printed layer (2) may contain various additives other than a resin component and coloring agent, such as plasticizer, defoamer, leveling agent, ultraviolet absorber, light stabilizer, heat stabilizer, crosslinking agent and the like, where necessary. Solvent may be blended for adjusting viscosity.

The resin component to be used for the ink is subject to no particular limitation, while melamine resin, epoxy resin, urethane resin, vinyl resin, polyester resin, alkyd resin and the like are preferred for their good dispersibility and stability of coloring agent is therein, solubility in solvent, weatherability, printability and intimate adherability to film. These resins can be used either alone or as copolymer of two or more thereof.

On the surfaces of the elements in the retororeflective element layer (4) of the specular reflection type cube-corner retroreflective sheeting, a metallic specular reflective layer (11) is mounted, and further an adhesive layer (9) is laminated in direct contact with the specular reflective layer (11). The specular reflection type triangular pyramidal cube-corner retroreflective sheeting of this embodiment retroreflects based on the principle of specular reflection and does not require an air layer, and hence does not require a binder layer and support layer.

In the specular reflection type cube-corner retroreflective sheeting of the present invention, a specular reflective layer (11) made of metal such as aluminum, copper, silver, nickel or the like can be provided on the surface of the retororeflective element layer (4), by such means as vacuum vapor deposition, chemical plating, sputtering or the like. Of those methods for forming the specular reflective layer (11), vacuum vapor deposition of aluminum is preferred, because it can lower the vapor deposition temperature and hence can minimize thermal deformation of the retroreflective element layer (4) in the vapor deposition step and brighten the color tone of resulting specular reflective layer (11).

A continuous vapor deposition apparatus for the aluminum specular reflective layer (11) is composed of a vacuum container capable of maintaining the degree of vacuum at around $7 \times 10^{-4}$–$9 \times 10^{-4}$ mmHg, and, as installed therein, an unwinder to draw out an original prismatic sheet composed of two layers of a substrate sheet and a surface-protective sheet laminated on the former's light-entering side surface, a reel to take up the vapor deposited original prismatic sheet, and a heater installed therebetween which is capable of fusing aluminum with an electric heater in a graphite crucible. Pure aluminum pellets having a purity of at least 99.99 wt % are fed into the graphite crucible, and the apparatus can carry out the vapor deposition treatment under the conditions of, for example, at an AC voltage of 350-360 V, electric current of 115-120 A and the processing rate of 30-70 m/min., vapor depositing fused and vaporized aluminum atoms on the surfaces of the retoroflective elements to provide a specular reflective layer (11) of, e.g., 800-2,000 Å in thickness.

Figure 3:
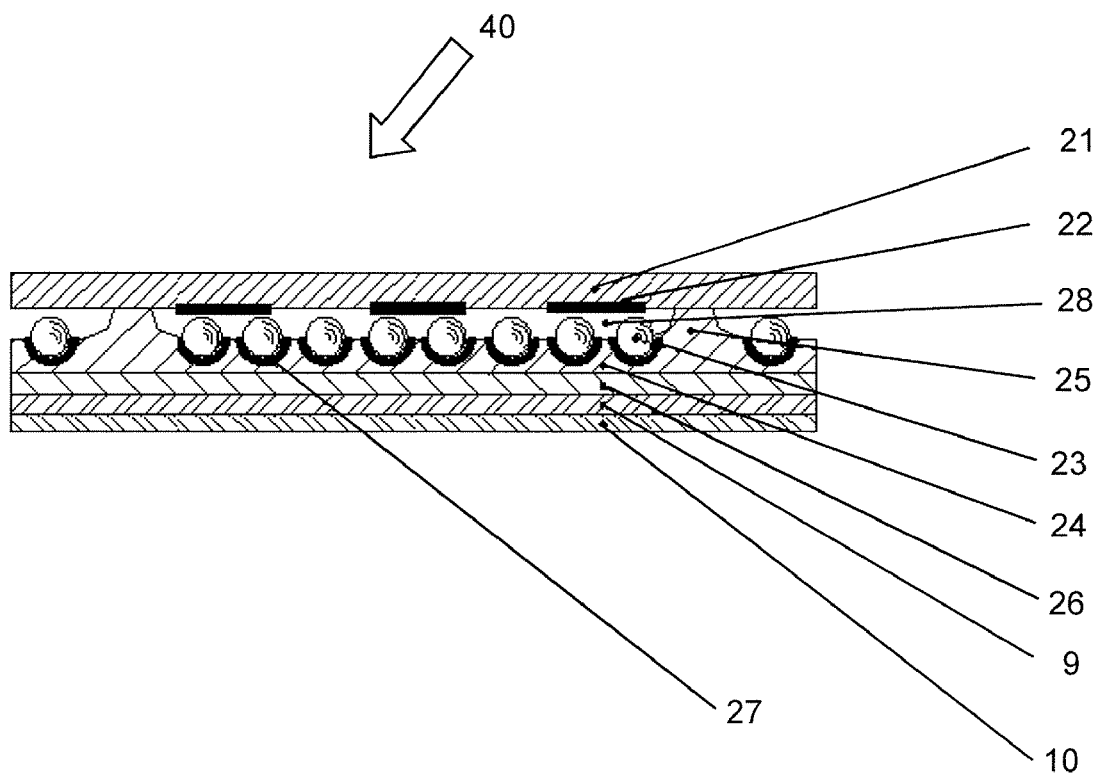
FIG. 3 is a cross-sectional view of an encapsulated lens type retroreflective sheeting.

FIG. 3 shows an embodiment of an encapsulated lens type retroreflective sheeting useful for the present invention.

In FIG. 3, a large number of retroreflective elements (23), which are microlens-type reflective elements provided by fine glass beads (23) partially carrying a specular reflective layer (27), are disposed in approximately the closest packed state and a retroreflective element layer is formed by embedding the fine glass beads in the binder layer (24), burying their specular reflective layer (27) side so as to be supported by the binder layer. This retroreflective element layer contains an air layer (28) which is sealed in capsules formed by the retroreflective elements (23), binder layer (24), surface-protective layer (21) and bonds (25) which bind these layers as a continuous network.

The encapsulated lens type retroreflective sheeting can exhibit retroreflectivity only when it holds an air layer (28) on the surfaces of the reflective elements (23) as above. The bonds (25) support the air layer (28) and at the same time prevent infiltration of, e.g., water, onto the surface of the retroreflective element layer. When the retororeflective element layer surface is covered with, e.g., water, light entering into the retroreflective elements (23) cannot focus on the specular reflective layer (27) on the elements due to thereby changed refractive index, and retroreflectivity of the sheeting is impaired.

The capsules in such an encapsulated lens type retroreflective sheeting, which comprise the retroreflective elements (23) and the retroreflective element layer and the air layer (28) are generally formed as follows:

(a) disperse fine glass beads onto a temporary support sheet having on its surface a thermoplastic layer such as of polyethylene, to the maximum possible uniformity, and embed the lower parts of the fine beads in the thermoplastic layer by heating;

(b) lead the fine glass beads-embedded temporary support sheet as obtained in (a) above to vaporized metal depositing apparatus to vapor deposit a metallic layer [specular reflective layer (27)] on the exposed surfaces of the fine glass beads;

(c) hot-press on the sheet as obtained in (b) above, in which the fine glass beads carrying the specular reflective layer (27) on their exposed surfaces are embedded, a thermoplastic resin sheet to serve as a binder layer (24) or, where necessary, the thermoplastic resin side of a laminate formed of the thermoplastic resin with a supporting resin sheet to serve as a support layer (26), to bury the specular reflective layer (27) portion of the fine glass beads into the thermoplastic resin layer, and peel the temporary support sheet off to transfer the specular reflective layer (27)—carrying fine glass beads to the thermoplastic resin layer, (d) lay on the fine glass beads side of the sheet as obtained in (c) above, a resin sheet to serve as the surface-protective layer (21), then partially deform the binder layer (24) by such means as heat-embossing from the backside of the binder layer (24) [the opposite to the light-entering side (40)] to thermofuse it with the surface-protective layer (21) and form the bonds (25); or (d') print a reticular pattern to serve as the bonds (25) with a suitable resin, on the surface of fine glass bead-side of the sheet as obtained in (c) above, mount thereon and adhere thereto the surface-protective layer (21) to form the bonds therebetween, (e) whereby forming the capsules enclosed by the surface-protective layer (21), binder layer (24) and bonds (25), which encapsulate the retroreflective element layer and air layer (28).

The retroreflective sheeting can be further provided with printed layer(s) for transferring information to observers or coloring the sheeting, a support layer (26) for supporting and reinforcing the binder layer, an adhesive layer (9) to stick the retroreflective sheeting onto other structure, a removable layer (10) and the like, according to individual utility and use environment of the sheeting.

According to this embodiment, the printed layer and latent image can be incorporated on the front surface or back of the surface layer or on the binder layer. For improving visibility of the pattern, they are preferably provided on the front surface or back of the surface layer.

The latent image may be formed on the same layer with the printed layer or in a different layer where the printed layer is composed of plural layers. It is preferably formed, however, on the front or back (the light-entering side is referred to as the front) of the surface-protective layer, for obtaining more distinct stereoscopic image. From the viewpoint of security, it is still better to form the latent image on the back of the surface-protective layer.

The printed layer (2) can be formed by those printing methods useful with above triangular pyramidal retroreflective sheeting, by such means as gravure printing, screen printing, offset printing, flexo printing, inkjet printing and laser printing.

For the halftone print for developing the latent image, those printing methods useful with the triangular pyramidal retroreflective sheeting can be adopted, by such means as gravure printing, screen printing, offset printing, flexo printing, inkjet printing and laser printing.

In the occasion of printing on the surface-protective layer (1), preferably the surface tension of the layer is adjusted to be at least 32 dyne/cm, for improving its printing characteristics. The ink for the printed layer (2) may contain various additives other than a resin component and coloring agent, such as plasticizer, defoamer, leveling agent, ultraviolet absorber, light stabilizer, heat stabilizer, crosslinking agent and the like, where necessary. Solvent may be blended for adjusting viscosity.

The resin component to be used for the ink is subject to no particular limitation, while melamine resin, epoxy resin, urethane resin, vinyl resin, polyester resin, alkyd resin and the like are preferred for their good dispersibility and stability of coloring agent therein, solubility in solvent, weatherability, printability and intimate adherability to film. These resins can be used either alone or as copolymer of two or more thereof.

The fine glass beads (23) which are used for making the retroreflective element layer are made of a glass of particularly high refractive index.

As the materials for composing each of the layers of this encapsulated lens type retroreflective sheeting, those similar to the materials as earlier described as to each of the corresponding layers in the cube-corner-type retroreflective sheeting can be use.

Of these layers, the support layer (26) which is optionally provided where necessary, is usually made of a resin which is stronger and more flexible than the material used for the binder layer (24) and which can be crosslinked by any known means, for example, using isocyanate as a crosslinking agent or by radiation, where necessary.

Also in the encapsulated lens type retroreflective sheeting of above-described construction, at least one of the layers closer to the light-entering side (the side indicated by the arrow 40 in FIG. 3) than the sealed air layer (18), i.e., the surface-protective layer (1) and/or the printed layer(s) as shown in FIG. 3, may contain as blended therein an ultraviolet absorber and/or light stabilizer similarly to those in cube-corner retroreflective sheeting, whereby providing an encapsulated lens type retroreflective sheeting excelling in weatherability.

Figure 4:
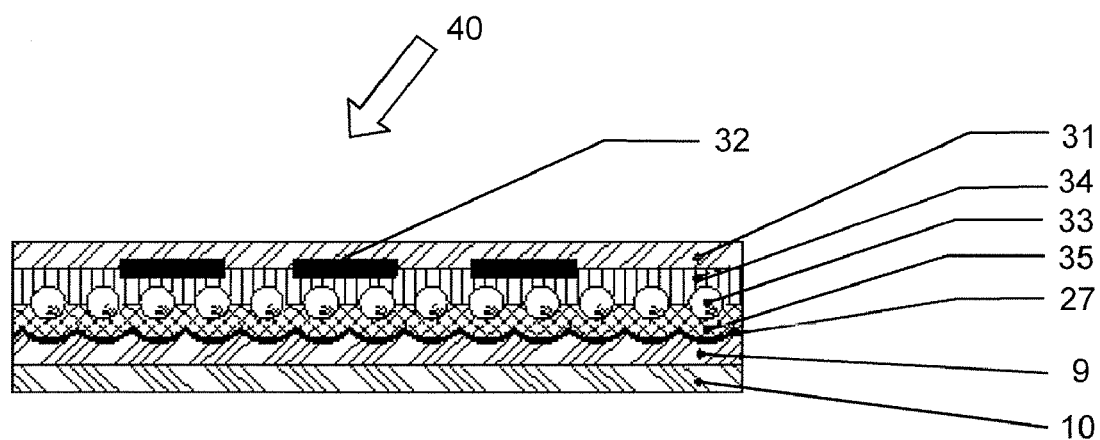
FIG. 4 is a cross-sectional view of an enclosed lens type retroreflective sheeting.

Next, an enclosed lens type retroreflective sheeting which is another embodiment of preferred construction of the present invention is explained, referring to FIG. 4, a cross-sectional view of the embodiment.

As shown in FIG. 4, the sheeting is composed of a surface layer (31) made of a transparent resin which supports a large number of transparent fine beads (33) having high refractive index, such as transparent microglass beads, as embedded therein; a layer of the transparent fine beads which are embedded in the beads-binding layer (34) to approximately ½ of their diameters; and a focus-adjusting layer (35), which is formed along the curved surface of the layer of the transparent fine beads (33) protruding from the beads-binding layer (34), and whose thickness is made constant so that the specular reflective layer (36) formed thereon is positioned approximately coinciding with the optical force of the transparent fine beads (33). The transparent fine beads (33) having the high refractive index, the focus-adjusting layer (35) and the specular reflective layer (36) are located at about the relative positions optically satisfying retroreflective conditions of light, together constituting an enclosed lens type retroreflective element.

The printed layer and latent image in this embodiment can be provided on the front surface or back of the surface layer or on the binder layer. Preferably they are provided on the front surface or back of the surface layer, for better visibility of the pattern.

The latent image may be formed on the same layer with the printed layer or in a different layer where the printed layer is composed of plural layers. It is preferably formed, however, on the front or back (the light-entering side is referred to as the front) of the surface-protective layer, for obtaining more distinct stereoscopic image. From the viewpoint of security, it is still better to form the latent image on the back of the surface-protective layer.

The printed layer (2) can be formed by those printing methods useful with above triangular pyramidal retroreflective sheeting, by such means as gravure printing, screen printing, offset printing, flexo printing, inkjet printing and laser printing.

For the halftone print for developing the latent image, those printing methods useful with the triangular pyramidal retroreflective sheeting can be adopted, by such means as gravure printing, screen printing, offset printing, flexo printing, inkjet printing and laser printing.

In the occasion of printing on the surface-protective layer (1), preferably the surface tension of the layer is adjusted to be at least 32 dyne/cm, for improving its printing characteristics. The ink for the printed layer (2) may contain various additives other than a resin component and coloring agent, such as plasticizer, defoamer, leveling agent, ultraviolet absorber, light stabilizer, heat stabilizer, crosslinking agent and the like, where necessary. Solvent may be blended for adjusting viscosity.

The resin component to be used for the ink is subject to no particular limitation, while melamine resin, epoxy resin, urethane resin, vinyl resin, polyester resin, alkyd resin and the like are preferred for their good dispersibility and stability of coloring agent therein, solubility in solvent, weatherability, printability and intimate adherability to film. These resins can be used either alone or as copolymer of two or more thereof.

The printed image or latent image can be formed on the front surface (the surface on the light-entering side) or back of the surface-protective layer (31) or on the surface of the retroreflective element layer, similarly to the above-described cube-corner type retroreflective sheeting or encapsulated lens type retroreflective sheeting. Also similar coloring agent can be used.

As the materials for composing, each of the layers of this enclosed lens type retroreflective sheeting, those similar to the materials as earlier described as to each of the corresponding layers in the cube-corner-type retroreflective sheeting can be use.

Also in the enclosed lens type retroreflective sheeting, the surface layer and the reflective layer may be blended with ultraviolet absorber and/or light stabilizer similarly to above-described cube-corner type retroreflective sheeting, whereby providing enclosed lens type retroreflective sheeting excelling in weatherability.

The retroreflective sheeting of the present invention is composed of a retroreflective sheeting bearing a printed image and an optical element array sheet in at least a fixed portion of which a large number of light-transmissive optical elements are regularly disposed. The optical element array sheet and the retroreflective sheeting are separately present, and the retroreoflective sheeting may be seen through the optical element array sheet, or the optical element array sheet may be laminated on the retroreflective sheeting, to vary the image by rotating or shifting the former's relative position to the retroreflective sheeting.

The retroreflective sheeting according to the present invention has a variable image which changes according to the relative positions of the optical element array sheet and the retroreflective sheeting. The variable image may be a planar two-dimensional image or stereoscopic three-dimensional image.

The retroreflective sheeting of the present invention can be conveniently used for number plates.

The number plates referred to herein are metal plates such as of aluminum, steel or the like on which the retroreflective sheeting is laminated, or have a structure that the light-entering side of the reflective sheeting is stuck on a transparent resin sheet with an adhesive.

For example, in the occasion like checkups, inspecting police officers can join an optical element array sheet to the number plates under inspection to reveal stereoscopic images.

The retroreflective sheeting according to the invention can also be conveniently used for certification plates.

For example, inspectors can join the optical element array sheet to certification plates to reveal stereoscopic images.

EXAMPLES

Example 1

Using as a transparent sheet material a 0.8 mm-thick polyester film, a regular uneven pattern was printed on the front surface of the film at a pitch of 80 lines/inch, each of the flat portions at the bottoms of the depressions in the pattern having a width of 5 μm, by means of silk screen printing with an ink for raised letters (braille) (tradename: UV POT-50209 Braille Clear, Teikoku Ink Co. Ltd.). Thus lenticular lens-1 was prepared.

On the surface of a triangular pyramidal cube-corner retroreflective sheeting (tradename: 92802 crystal grade, Nippon Carbide Industries Inc.), an original of a stereoscopic image was set in accord with the pitch of 80 lines/inch. Using the plate made by resolving the image with a computer soft (tradename: Lenticular F/X, Lenticular Development Co.), halftone printed image was obtained by UV offset printing.

When the earlier prepared lenticular lens was joined onto the printed image formed on the retroreflective sheeting, with the front surface of the lenticular lens on the top, a clear stereoscopic image was obtained.

Example 2

A 0.47 mm-thick lenticular lens having a lens pitch of 72 lines/inch was made by press working, to provide lenticular lens-2.

On the surface of the retroreflective sheeting used in Example 1, a printed image was formed by on-demand printing at a halftone dot density of 300 lines/inch, by means of UV offset printing.

When the lenticular lens-2 was joined onto, with its front surface on the top, the printed image formed on the retroreflective sheeting, a clear stereoscopic image was obtained.

Example 3

On the surface of an encapsulated lens-type retroreflective sheeting (tradename: F812, ULS grade, Nippon Carbide Industries Inc.) a halftone printed image was formed by 120-140 lines offset printing.

When a convex lens array sheet (made of polyester resin, 0.3 mm-thick, 130 lines/inch, made by Meiwa Gravure Co.) was joined onto the printed image formed on the retroreflective sheeting, a clear stereoscopic image was obtained.

Example 4

Example 3 was repeated except that the convex lens array sheet was joined onto the printed image formed on the retroreflective sheeting, with its backside on the top. A clear stereoscopic image was obtained.

Example 5

A halftone printed image was obtained in the manner similar to Example 3, except that an enclosed lens type retroreflective sheeting (tradename, 48012, license plate grade ELG, Nippon Carbide Industries, Inc.) was used as the retroreflective sheeting.

When a convex lens array sheet was joined onto the printed image formed on the retroreflective sheeting, similarly to Example 3, a clear stereoscopic image was obtained.

Example 6

A printed image was formed in the manner similar to Example 5, except that the halftone printing on the retroreflective sheeting was carried out at 130 lines/inch.

When a convex lens sheet was superposed on the printed image formed on the retroreflective sheeting similarly to Example 3, no stereoscopic image was obtained, but when the convex lens sheet was rotated on the printed image, the stereoscopic image varied accompanying the rotation, which looked clear at times.

Example 7

A printed images was formed in the manner similar to Example 5, except that the line number of the halftone print was made 300.

When the convex lens sheet was joined onto the printed image formed on the retroreflective sheeting similarly to Example 3, a stereoscopic image was obtained, which however was unclear.

Example 8

A polyethylene terephthalate film was used as the carrier film, and on which a mixture of 50 wt parts of a polyester resin solution made by Mitsui Chemicals, Inc. (tradename: ALMATEX HMP-90S), 10 wt % of a polyester resin solution made by Mitsui Chemicals, Inc. (ALMATEX P-110), 40 wt parts of a polyester resin solution made by Mitsui Chemicals, Inc. (tradename: ORESTAR Q-203), 11 wt parts of a methylated melamine resin solution made by Sanwa Chemical Co. (tradename: NIKALAC MS-11), 0.2 wt part of an acrylic resin made by Mitsui Chemicals, Inc. (tradename: RESIMIX RL-4), 0.005 wt part of an antiblocking agent made by Toshiba Silicone Co. (tradename: TSF4445), 6 wt parts of a cellulose derivative made by Tokushu Shikiryo K.K. (tradename: CAB), 0.6 wt part of an ultraviolet absorber made by Ciba Speciality Chemicals, K.K. (tradename: Tinuvin 213), 0.1 wt part of a catalyst made by Dainippon Ink & Chemicals, Inc. (BECKAMINE P-198) and 25 wt parts of a solvent mixture, MIKB/toluene/IPA=66/32/2, was applied and dried to provide a 32 μm-thick film-1.

Further on the film-1, a halftone printed image was formed by offset printing with a transparent blue ink (made by Tokushu Shikiryo K.K, tradename: N-3506) at a line density of 120-140.

On the film-1 having the printed image, a mixture of 100 wt parts of a toluene/MIBK (1:1) solution (solid content=40%) of MMA/EA/2HEMA copolymer (weight ratio: MMA/EA/HEMA=21/65/14), 8 wt parts of an isocyanate crosslinking agent made by Sumitomo Bayer Urethane Co., Ltd. (tradename: SUMIDUR N-75) and 35.8 wt parts of a solvent mixture of MIBK/toluene/high boiling point solvent (by Shinnippon Petrochemicals Co., Ltd, tradename: SUPERSOL 1500) at the ratio of 39/16/45, was applied and dried to provide film-2 which had a combined thickness with the film-1 of 63 μm.

On the film-2, glass beads made by Union Beads K.K. (tradename: UNIBEADS N-34S) were dispersed, and thereafter the film-2 was dried and cured.

Further on the beads, a mixture of 100 wt parts of a toluene/xylene/ethyl acetate/n-butanol (11/45/29/15) solution (solid content=30%) of MMA/BA/AA copolymer (weight ratio: MMA/BA/AA=35/50/15), 5.5 wt parts of a methylated melamine resin solution made by Sanwa Chemical Co. (tradename: NIKALAC MS-11) and 39.3 wt parts of a solvent mixture of MIBK/toluene=⅔, was applied and dried to form film-3.

On the film-3, aluminum was vacuum vapor deposited to form film-4.

Also as the removable paper, a product by Lintech K.K. (tradename: E2AP-LK-BL(P)) was used, on which a mixture of 100 wt parts of an ethyl acetate/toluene (1/1) solution (solid content=34%) of BA/AA copolymer (weight ratio: BA/AA=90/10), 1 wt part of an isocyanate crosslinking agent made by Nippon Polyurethane Industries Co. (tradename: CORONATE L) and 17.8 wt parts of ethyl acetate as a solvent, was applied and dried to form a 40 μm-thick tackifier layer.

After sticking this tackifier layer with the previously formed film-4, the carrier film was peeled off to provide a retroreflective sheeting having the internally printed image.

Similarly to Example 3, a convex lens sheet was joined onto the printed image in the retroreflective sheeting and whereby a clear stereoscopic image was obtained.

Example 9

On the surface of the retroreflective sheeting used in Example 5, a printed image was formed by offset polychromatic printing at 120-140 lines, in which three colors were halftone printed and the other two colors were solidly printed.

When a convex lens sheet was joined onto the printed image formed in the retroreflective sheeting similarly to Example 3, the tricolor halftone printed part gave a clear stereoscopic image but the solidly printed part did not give a stereoscopic image.

Example 10

On the surface of the retroreflective sheeting which was used in Example 1, a printed image was formed by 120-140 lines offset printing.

The back of the convex lens array sheet was stuck together with the tackifer layer as prepared in Example 8, the removable paper was peeled off, and the exposed surface was adhered to the retroreflective sheeting from above the printed image formed in the retroreflective sheeting. Whereupon a retroreflective sheeting was obtained, in which the stereoscopic image was always visible.

Example 11

The convex lens array sheet used in Example 3 was stuck to the retroreflective sheeting used in Example 6, in such a manner as would make their crossing angle 15°. Thus a retroreflective sheeting was obtained in which the stereoscopic image was always visible.

Example 12

The tackifier layer as prepared in Example 8 was stuck to the back of the lenticular lens sheet which was used in Example 1, and the removable paper was peeled off, to adhere the lenticular lens sheet to the retroreflective sheeting as prepared in Example 8, from above the printed image as formed in the retroreflective sheeting. Thus a retroreflective sheeting was obtained in which the stereoscopic image was always visible.

Example 13

A 0.8 mm-thick polyester film was used as the transparent sheet material, and on about a half of the front surface area of the polyester film a regular uneven pattern was printed at a pitch of 80 lines/inch, each of the flat portions at the bottoms of the depressions in the pattern having a width of 5 μm, by means of silk screen printing with an ink for raised letters (tradename: UV POT-50209 Braille Clear, Teikoku Ink Co., Ltd.). Thus a partial lenticular lens-3 was prepared.

When the lenticular lens-3 was joined onto, with its front surface on the top, the printed image formed in the retroreflective sheeting which was prepared in Example 1, at the part where the lenses were present, clear stereoscopic image was obtained, while at the part where the lens was absent, the printed image remained as it was.

Example 15

The lenticular lens-2 as prepared in Example 2 was joined side-by-side to the polyester film which was used in Example 1, to provide a lenticular lens-4.

In the manner similar to Example 13, the lenticular lens-4 was joined onto the printed image in the retroreflective sheeting of Example 1. At the part where the lenses were present, clear stereoscopic image was obtained, while at the part where the lens was absent, the printed image remained as it was.

INDUSTRIAL APPLICABILITY

The invention makes a virtual image appear in retroreflective sheeting, utilizing visual illusion. Making use of the virtual image, the invention provides retroreflective sheeting useful for tamper prevention for signs, number plates and the like which utilize the retroreflective sheeting.

The invention claimed is:

1. A retroreflective sheeting, comprising: a printed image-incorporated retroreflective sheeting, said printed image comprising at least one stereoscopic latent image formed of a transparent colorant composition, said printed image-incorporated retroreflective sheeting having an optical element array sheet laminated thereon, said optical element array sheet providing a large number of light-transmissive optical elements regularly disposed at fixed locations and providing a variable image when the printed image is seen through the optical element array sheet, wherein said variable image varies depending on the relative position of the optical element array sheet to the retroreflective sheeting, and the latent image portion has retroreflectivity.

2. The retroreflective sheeting according to claim 1, wherein the optical element array sheet is a lenticular lens sheet.

3. The retroreflective sheeting according to claim 2, wherein the lenticular lens has a thickness of 0.2-3.0 mm.

4. The retroreflective sheeting according to claim 3, wherein the lens pitch (a) of the lenticular lens is 20-150 lines/inch.

5. The retroreflective sheeting according to claim 4, wherein the latent image incorporated in the retroreflective sheeting is a pattern halftone printed based on the plate which is made by image resolution of the image to be used for formation of a stereoscopic image at the same pitch with the lens pitch (a) of the lenticular lens.

6. The retroreflective sheeting according to claim 5, wherein the lens pitch (a) and the line number (b) of the halftone print forming the latent image satisfy the relationship defined by the following equation (1):

$$b = A \times a \qquad (1)$$

wherein A is a positive value within a range of 1 to 7.5.

7. The retroreflective sheeting according to claim 1, wherein the optical element array sheet is a convex lens array sheet.

8. The retroreflective sheeting according to claim 7, wherein the array pattern of the convex lens array sheet and the array pattern of the halftone print are orthogonal arrays.

9. The retroreflective sheeting according to claim 8, wherein the line number (d) of the convex lens array is 10-150.

10. The retroreflective sheeting according to claim 9, wherein the latent image in the retroreflective sheeting is formed by halftone print and the line number (c) of the halftone printed part and the line number (d) of the convex lens array satisfy the relationship defined by the following equation (2):

$$c = B \times d \qquad (2)$$

wherein B is a positive value within a range of 0.5 to 1.5.

11. The retroreflective sheeting according to claim 10, wherein c and d are not equal.

12. The retroreflective sheeting according to claim 11, wherein the crossing angle (A) of the array pattern of the convex lens array sheet and the array pattern of the halftone print is $0° < \theta < 45°$.

13. The retroreflective sheeting according to claim 12, wherein the retroreflective sheeting is a total internal reflection type cube-corner retroreflective sheeting, specular reflection type cube-corner retroreflective sheeting, encapsulated lens type retroreflective sheeting, enclosed lens type retroreflective sheeting or open lens type retroreflective sheeting.

14. A number plate comprising the retroreflective sheeting according to claim 13.

15. A certification sticker comprising the retroreflective sheeting according to claim 13.

16. The retroreflective sheeting according to claim 10, wherein c and d are equal.

* * * * *

UNITED STATES PATENT AND TRADEMARK OFFICE
CERTIFICATE OF CORRECTION

PATENT NO.         : 8,147,075 B2
APPLICATION NO.    : 11/910794
DATED              : April 3, 2012
INVENTOR(S)        : Ikuo Mimura et al.

It is certified that error appears in the above-identified patent and that said Letters Patent is hereby corrected as shown below:

COLUMN 1:

Line 29, "printed" should read --print--.

COLUMN 2:

Line 54, "(Patent Reference)," should read --(Patent Reference 3),--.

COLUMN 4:

Line 57, "WO 011057560" should read --WO 01/057560--.

COLUMN 5:

Line 13, "the" should read --a-- and "ranging" should read --ranging from--;
   Line 19, "ranges" should read --ranges from--;
   Line 30, "emboss" should read --embossed--; and
   Line 59, "UW" should read --UV--.

COLUMN 6:

Line 42, "details." should read --detail.--; and
   Line 49, "details" should read --detail--.

COLUMN 7:

Line 4, "other" should read --another--.

COLUMN 8:

Line 7, "retororeflective" should read --retroreflective--;
   Line 46, "in the next," should read --below-- and "its" should read --the--;
   Line 47, "view" should read --view of FIG. 2--; and
   Line 53, "reflection type" should read --reflection-type--.

Signed and Sealed this
Twelfth Day of June, 2012

David J. Kappos
*Director of the United States Patent and Trademark Office*

COLUMN 9:

Line 62, "at" should be deleted.

COLUMN 10:

Line 26, "lens type" should read --lens-type--.

COLUMN 11:

Line 54, "use." should read --used.--; and
Line 61, "lens type" should read --lens-type--.

COLUMN 13:

Line 2, "lens" should read --lens- --;
Line 9, "use." should read --used.--;
Line 10, "lens type" should read --lens-type--; and
Line 14, "lens type" should read --lens-type--.

COLUMN 14:

Line 43, "(tradename," should read --(tradename:--.

COLUMN 17:

Line 40, "printed" should read --print--.

COLUMN 18:

Line 27, "angle (A)" should read --angle (2)--.